US009327762B2

(12) United States Patent
Oblizajek et al.

(10) Patent No.: US 9,327,762 B2
(45) Date of Patent: May 3, 2016

(54) ELECTRIC POWER STEERING SYSTEMS WITH IMPROVED ROAD FEEL

(75) Inventors: Kenneth L. Oblizajek, Troy, MI (US); John D. Sopoci, Commerce Township, MI (US); Stephen R. Pastor, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 12/967,112

(22) Filed: Dec. 14, 2010

(65) Prior Publication Data
US 2012/0150389 A1    Jun. 14, 2012

(51) Int. Cl.
*A01B 69/00*   (2006.01)
*B62D 6/00*    (2006.01)
*B62D 11/00*   (2006.01)
*B62D 12/00*   (2006.01)
*B63G 8/20*    (2006.01)
*B63H 25/04*   (2006.01)
*G05D 1/00*    (2006.01)
*G06F 7/00*    (2006.01)
*G06F 17/00*   (2006.01)
*G06F 19/00*   (2011.01)
*B62D 5/04*    (2006.01)

(52) U.S. Cl.
CPC ................................... *B62D 5/0472* (2013.01)

(58) Field of Classification Search
USPC ....................................................... 701/41, 42
See application file for complete search history.

(56) References Cited

U.S. PATENT DOCUMENTS

| | | | |
|---|---|---|---|
| 4,885,722 | A | 12/1989 | Leland |
| 5,473,231 | A | 12/1995 | McLaughlin et al. |
| 5,504,403 | A | 4/1996 | McLaughlin |
| 5,919,241 | A | 7/1999 | Bolourchi et al. |
| 6,064,931 | A | 5/2000 | Sawada et al. |
| 6,122,579 | A | 9/2000 | Collier-Hallman et al. |
| 6,137,886 | A | 10/2000 | Shoureshi |
| 6,161,068 | A | 12/2000 | Kurishige et al. |
| 6,263,738 | B1 | 7/2001 | Hogle |
| 6,625,530 | B1 | 9/2003 | Bolourchi |
| 6,647,329 | B2 | 11/2003 | Kleinau et al. |
| 6,681,883 | B2 | 1/2004 | Loh et al. |
| 6,714,858 | B2 | 3/2004 | Oblizajek et al. |

(Continued)

FOREIGN PATENT DOCUMENTS

| | | |
|---|---|---|
| CN | 101746412 A | 6/2010 |
| CN | 101821150 A | 9/2010 |

(Continued)

OTHER PUBLICATIONS

Oblizajek, K.L., et al. "Methods, Systems and Apparatus for Steering Wheel Vibration Reduction in Electric Power Steering Systems," U.S. Appl. No. 12/882,852, filed Sep. 15, 2010.

(Continued)

*Primary Examiner* — Imran Mustafa
(74) *Attorney, Agent, or Firm* — Ingrassia Fisher & Lorenz, P.C.

(57) ABSTRACT

A method is provided for controlling a motor drive torque in an EPS system having a motor and a steering assembly. The method includes receiving a torque signal from the steering assembly; processing the torque signal in accordance with a steering perception program to produce a motor control signal; and controlling the motor drive torque based on the motor control signal.

17 Claims, 5 Drawing Sheets

(56) References Cited

U.S. PATENT DOCUMENTS

| | | |
|---|---|---|
| 6,742,620 B2 | 6/2004 | Eidam et al. |
| 6,827,177 B2 | 12/2004 | Asada et al. |
| 6,999,862 B2 | 2/2006 | Tamaizumi et al. |
| 7,068,923 B2 | 6/2006 | Miyazaki |
| 7,079,929 B2 | 7/2006 | Sawada et al. |
| 7,222,008 B2 | 5/2007 | Takahashi et al. |
| 7,363,135 B2 | 4/2008 | Lin et al. |
| 7,604,088 B2 | 10/2009 | Nishizaki et al. |
| 8,046,131 B2 | 10/2011 | Tanaka et al. |
| 2001/0047233 A1 | 11/2001 | Kleinau et al. |
| 2002/0033300 A1 | 3/2002 | Takeuchi et al. |
| 2002/0043423 A1* | 4/2002 | Endo ............... B62D 5/0466 180/446 |
| 2002/0056587 A1 | 5/2002 | Shibasaki et al. |
| 2002/0059824 A1 | 5/2002 | Ono et al. |
| 2003/0106736 A1 | 6/2003 | Kogiso et al. |
| 2004/0099471 A1 | 5/2004 | Asada et al. |
| 2004/0138797 A1* | 7/2004 | Yao ................. B62D 5/0463 701/44 |
| 2004/0204812 A1 | 10/2004 | Tran |
| 2004/0245041 A1 | 12/2004 | Fukuda et al. |
| 2005/0027417 A1 | 2/2005 | Sawada et al. |
| 2005/0119810 A1 | 6/2005 | Kasbarian et al. |
| 2005/0140322 A1* | 6/2005 | Itakura ............. B60G 17/016 318/466 |
| 2005/0182541 A1 | 8/2005 | Tamaizumi et al. |
| 2005/0274560 A1 | 12/2005 | Wakao et al. |
| 2006/0001392 A1 | 1/2006 | Ajima et al. |
| 2006/0180369 A1 | 8/2006 | Brosig et al. |
| 2007/0107978 A1 | 5/2007 | Aoki et al. |
| 2007/0118262 A1 | 5/2007 | Nishizaki et al. |
| 2007/0120511 A1* | 5/2007 | Kobayashi ........ B62D 5/0466 318/432 |
| 2007/0198153 A1 | 8/2007 | Oya et al. |
| 2007/0201704 A1 | 8/2007 | Ishii et al. |
| 2007/0205041 A1 | 9/2007 | Nishizaki et al. |
| 2007/0250234 A1 | 10/2007 | Ito et al. |
| 2008/0001728 A1 | 1/2008 | Dufournier |
| 2008/0035411 A1 | 2/2008 | Yamashita et al. |
| 2008/0189014 A1* | 8/2008 | Tanaka ............. B62D 5/0466 701/42 |
| 2008/0243329 A1 | 10/2008 | Hamel et al. |
| 2008/0262678 A1* | 10/2008 | Nishimura ........ B62D 5/0472 701/42 |
| 2008/0297077 A1 | 12/2008 | Kovudhikulrungsri et al. |
| 2009/0125186 A1 | 5/2009 | Recker et al. |
| 2009/0187312 A1 | 7/2009 | Nozawa et al. |
| 2009/0224502 A1* | 9/2009 | Yamawaki ............ B60G 17/06 280/124.108 |
| 2009/0294206 A1* | 12/2009 | Oblizajek ............ B62D 5/0472 180/446 |
| 2010/0138109 A1 | 6/2010 | Wang et al. |
| 2011/0153162 A1 | 6/2011 | Kezobo et al. |
| 2012/0061169 A1 | 3/2012 | Oblizajek et al. |
| 2013/0030654 A1 | 1/2013 | Oblizajek et al. |

FOREIGN PATENT DOCUMENTS

| | | | |
|---|---|---|---|
| DE | 102006051747 A1 | 5/2007 | |
| DE | 102006057880 A1 | 6/2008 | |
| DE | 102007014344 A1 | 10/2008 | |
| DE | 102008059906 A1 | 6/2010 | |
| EP | 2030868 A1 | 3/2009 | |
| EP | 1975040 B1 | 10/2009 | |
| JP | 2000168600 A | 6/2000 | |
| JP | 2001138939 A | 5/2001 | |
| WO | 2008116555 A1 | 10/2008 | |
| WO | WO 2009154119 A1 * | 12/2009 | ........... B62D 5/0481 |

OTHER PUBLICATIONS

German Office Action, dated Feb. 8, 2012, for German Patent Application No. 102011086295.1.
State Intellectual Property Office of the P.R.C., Office Action for Chinese Patent Application No. 201110272866.4, mailed Aug. 30, 2013.
USPTO, Office Action for U.S. Appl. No. 12/882,852, mailed Jan. 29, 2013.
State Intellectual Property Office of the People's Republic of China, Office Action for Chinese Patent Application No. 201110417142.4, mailed Jun. 4, 2014.
USPTO, U.S. Appl. No. 12/882,852, filed Sep. 15, 2010.
USPTO, U.S. Appl. No. 13/841,031, filed Mar. 15, 2013.
USPTO, U.S. Appl. No. 12/326,684, filed Dec. 2, 2008.
USPTO, Office Action in U.S. Appl. No. 12/882,852 mailed Jun. 8, 2015.
State Intellectual Property Office of the People's Republic of China, Office Action in Chinese Patent Application No. 201410094270.3 mailed Nov. 4, 2015.

* cited by examiner

ELECTRIC POWER STEERING SYSTEMS WITH IMPROVED ROAD FEEL

TECHNICAL FIELD

The present invention generally relates to the field of vehicles and, more specifically, to methods and systems for controlling electric steering assist in vehicles with electric power steering systems.

BACKGROUND

Many vehicles today have electric power steering (EPS) systems. EPS systems typically use an electric motor to provide a steering assist to a driver of the vehicle in manipulating the steering assembly and wheel, thereby reducing effort by the driver in steering the vehicle. During operation, vibrations within the vehicle may propagate to the driver at the steering wheel. For example, smooth road shake (SRS) is a type of vibration leading to driver complaints.

SRS is caused by internal periodic excitation such as wheel imbalances, tire irregularities, brake rotor imbalance and lack of precision piloting of the rotating members. Some EPS systems may employ active control mechanisms to mitigate SRS. Although conventional EPS systems may succeed in mitigating SRS, these control devices and methods may impact the driver's perception of steering responsiveness. For example, conventional control devices may adversely impact driver perception with respect to on-center steering and/or road feel.

Accordingly, it is desirable to provide improved EPS systems to reduce the steering wheel vibration of the vehicles while maintaining other desirable driving characteristics. Furthermore, other desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a method is provided for controlling a motor drive torque in an electric power steering system having a motor and a steering assembly. The method includes receiving a torque signal from the steering assembly; processing the torque signal in accordance with a steering perception program to produce a motor control signal; and controlling the motor drive torque based on the motor control signal.

In accordance with an exemplary embodiment, a system is provided for controlling a motor drive torque for a vehicle having a motor and a steering assembly. The system includes a sensor configured to at least facilitate obtaining a torque signal from the steering assembly; and a processor coupled to the sensor and configured to at least facilitate: receiving the torque signal from the sensor; processing the torque signal in accordance with a steering perception program to produce a motor control signal; and controlling the motor drive torque based on the motor control signal.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Broadly, exemplary embodiments discussed herein provide an electric power steering (EPS) system that assists a driver in steering a vehicle. Particularly, when generating the control signals for the motor, the EPS system optionally applies a dither used in vibration attenuation programs such that steering perception programs may be incorporated into the resulting motor control signals. This enables the mitigation or elimination of undesired vibrations in the steering wheel while maintaining performance characteristics relating to driver perceptions of road feel or handling.

Figure 1:
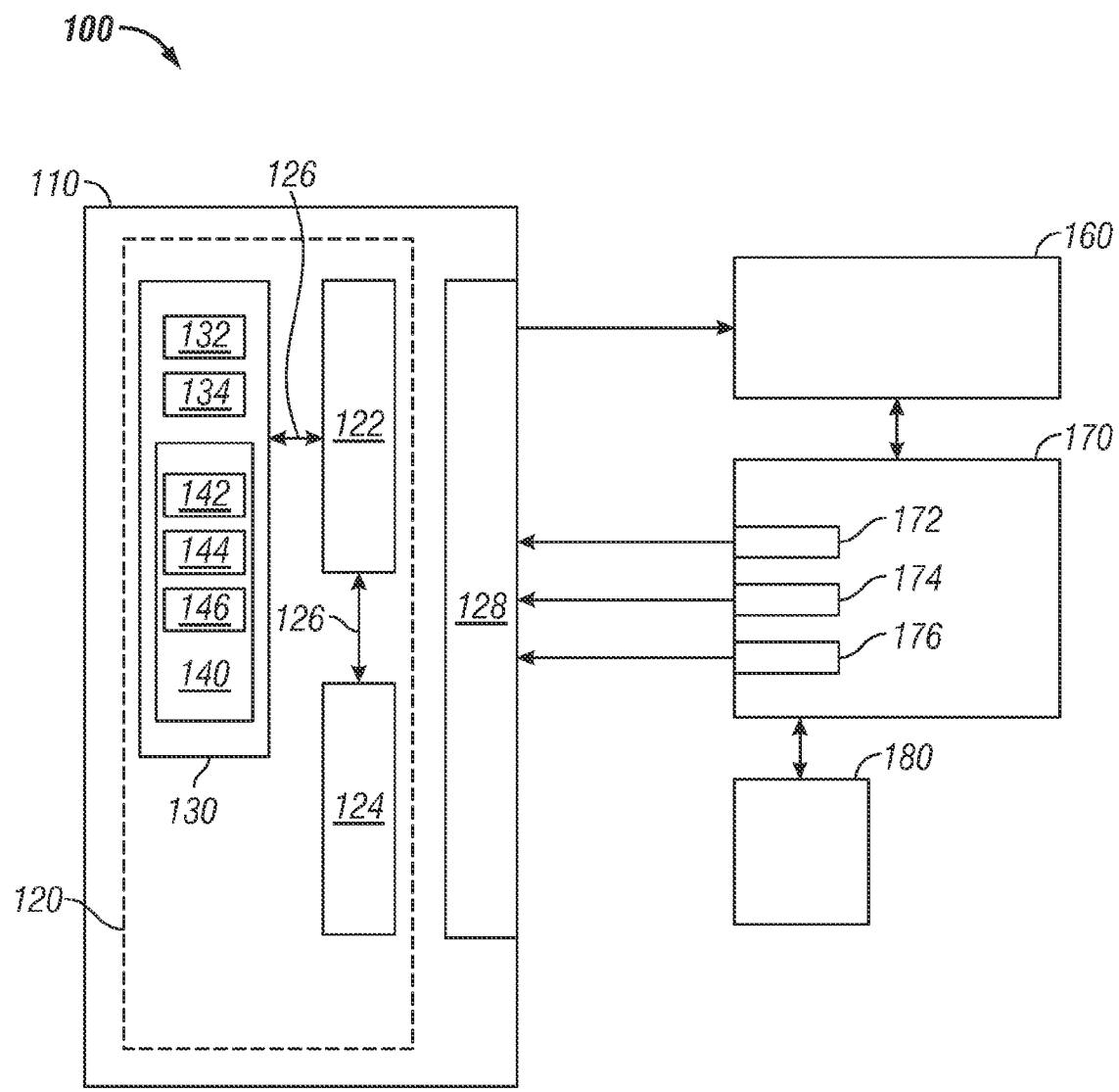
FIG. 1 is a functional block diagram of an electric power steering (EPS) system of a vehicle in accordance with an exemplary embodiment.

FIG. 1 is a functional block diagram of an electric power steering (EPS) system 100 of a vehicle in accordance with an exemplary embodiment. As described below, the EPS system 100 includes a controller 110, a motor 160, a steering assembly 170, and wheels 180. In certain embodiments, the vehicle associated with the EPS system 100 includes an automobile such as a sedan, a truck, a van, a sport utility, a cross-over vehicle, or another type of automobile. However, in various embodiments, the EPS system 100 can be used in connection with any number of types of vehicles.

The steering assembly 170 may include any suitable components for adjusting the position of the wheels 180 based on driver intent. For example, the steering assembly 170 may include a steering wheel; steering column; steering gear; intermediate connecting shafts between the column and the gear; connection joints, either flexible or rigid, allowing desired articulation angles between the intermediate connecting shafts; and tie-rods. The steering assembly 170 may also include one or more sensors 172, 174, and 176 for measuring vehicle parameters, such as for example, a steer angle sensor 172, a torque sensor 174, and a speed sensor 176. As will be described in greater detail below, the steer angle sensor 172 measures the angle of the steering wheel (not shown). The torque sensor 174 generates an electronic torque signal proportional to the static or dynamic mechanical torque in one of the shafts connecting the steering wheel to the steering gear. The speed sensor 176 is coupled to a rotating shaft of the transmission, or alternately one of the road wheels 180, to enable determination of vehicle speed. In an alternate embodiment, the sensors 172, 174, and 176 may be omitted and the corresponding values may be estimated from other vehicle modules or sources.

As noted above, the motor 160 assists the driver in manipulating the steering assembly 170 to steer the wheels 180. As described below, the motor 160 is typically controlled by a variable current supplied by the controller 110. The motor 160 may provide torque or force to a rotatable or translational member of the steering assembly 170. For example, the motor 160 can be coupled to the rotatable shaft of the steering column or to the rack of the steering gear. In the case of a rotary motor, the motor 160 is typically connected through a geared or belt driven configuration enabling a favorable ratio of motor shaft rotation to either column shaft rotation or rack linear movement. The steering assembly 170 in turn influences the wheels 180 during steering based upon the assist torque received from the motor 160 along with any torque received from a driver of the vehicle.

As noted above, the controller 110 typically provides a current based on control signals to the motor for controlling the steering assembly 170. Generally, the controller 110 may include a computer system 120 and an interface 128 that enables the controller 110 to interact with the other components of the EPS system 100. In the depicted embodiment, the computer system 120 includes a processor 122, a storage device 124, a computer bus 126, an interface 128, and a memory 130, each of which will be briefly introduced before a more detailed description of more specific functions.

The processor 122 performs the computation and control functions of the computer system 120 or portions thereof, and may include any type of processor or multiple processors, single integrated circuits such as a microprocessor, or any suitable number of integrated circuit devices and/or circuit boards working in cooperation to accomplish the functions of a processing unit. During operation, the processor 122 executes one or more programs, such as control programs 140 stored in within the memory 130 and, as such, controls the general operation of the computer system 120. As discussed below, the control programs 140 include a dithering program 142, a vibration attenuation program 144, and a steering perception program 146. In the depicted embodiment, the memory 130 also stores a plurality of transfer function or alternate compensation parameters and related information 132 and one or more look-up tables 134 for use in generating the motor control signals. In general, the dithering program 142, vibration attenuation program 144, and steering perception program 146, as well has the transfer function or alternate compensation parameters 132 and look-up tables 134, may each include any number of algorithms, instructions, maps, tables and data for processing inputs to perform a designated function.

The memory 130 can be any type of suitable memory. This would include the various types of dynamic random access memory (DRAM) such as SDRAM (synchronous dynamic access memory), the various types of static RAM (SRAM), and the various types of non-volatile memory (PROM (programmable read only memory), EPROM (erasable programmable read only memory), and flash. It should be understood that the memory 130 may be a single type of memory component, or it may be composed of many different types of memory components. In addition, the memory 130 and the processor 122 may be distributed across several different computers that collectively comprise the computer system 120. For example, a portion of the memory 130 may reside on a computer within a particular apparatus or process, and another portion may reside on a remote computer.

The computer bus 126 serves to transmit programs, data, status and other information or signals between the various components of the computer system 120 and the signals from other modules. The computer bus 126 can be any suitable physical or logical means of connecting computer systems and components. This includes, but is not limited to, direct hard-wired connections, fiber optics, infrared and wireless bus technologies, a LAN (local area network) bus, a CAN (controller area network) bus and/or one or more other technologies.

The interface 128 allows communication to the computer system 120, for example from a vehicle occupant, a system operator, and/or another computer system, and can be implemented using any suitable method and apparatus. In certain embodiments, the interface 128 at least facilitates providing the steer angle, torque, and vehicle speed to the processor 122. The interface 128 can include one or more network interfaces to communicate within or to other systems or components, one or more terminal interfaces to communicate with technicians, and one or more storage interfaces to connect to storage apparatus such as the storage device 124. As one exemplary implementation, the interface 128 may also utilize Internet connectivity, for example for providing or maintaining data or performing operations thereon.

The storage device 124 can be any suitable type of storage apparatus, including direct access storage devices such as hard disk drives, flash systems, floppy disk drives and optical disk drives. In one exemplary embodiment, the storage device 124 is a program product from which memory 130 can receive a program that executes one or more embodiments of the processes and/or steps discussed herein.

During operation of the vehicle, undesirable vibrations may result from internal sources, such as a tire or wheel imbalance, or external sources, such as irregular road surfaces. Periodic vibrations may propagate throughout the steering assembly 170 and can cause an undesirable shake or movement of certain vehicle components that are noticeable to the driver. For example, if unaddressed, periodic vibrations generated at the wheels 180 can combine to create a dynamic torque on a steering wheel column component that causes steering wheel vibrations. When this type of event occurs on a flat or smooth road surface, it is referred to as smooth road shake (SRS) or torsional nibble.

As will now be described, the controller 110 controls the motor 160 to attenuate vibrations within the steering assembly 170 while maintaining desirable steering characteristics, including driver road feel. The operation of the controller 110 will be described in conjunction with FIG. 2, which is a flowchart of a process 200 for controlling motor drive torque in the vehicle in accordance with an exemplary embodiment. Such processing steps may be implemented with data and code stored in memory 130.

In a first step 205 of the process 200, the controller 110 receives a signal from the torque sensor 174 representing the internal vibrations within the steering assembly 170. These internal vibrations may correspond, for example, to smooth road shake (SRS) or other steering assembly excitations and may be referred to as torque signals, and may include excitations from sources external to the EPS 100 as well as vibrations introduced by the EPS.

In a second step 210, the controller 110 further receives characteristics of the steering wheel of the steering assembly 170, including steer angle from the steer angle sensor 172 representing the angle of the steering wheel. The controller 110 may also receive characteristics such as steering wheel velocity or acceleration, which may be measured directly or derived from other measurements.

In a third step 215, the processor 122 of the controller 110 evaluates the torque signals and determines if the vibration attenuation program 144 should be executed. Generally, the vibration attenuation program 144 may be executed based on the level of vibrations determined from the torque signal and/or the anticipated level of vibrations expected based on the present or previous motor control signals, i.e., the level of expected vibrations resulting from previous iterations or application of the vibration attenuation program. The motor control signals are discussed below, although the expected vibrations may be derived based on the inverse transfer functions from the transfer functions 132 stored in memory 130.

In one exemplary embodiment, the measured vibrations and the control signal vibrations may be jointly considered to determine the appropriate level of vibration attenuation. For example, the measured vibrations and the control signal vibrations may be combined and compared to a predetermined threshold value. If the combined measured and control signal vibrations are greater than the predetermined threshold value, then the process 200 proceeds to step 220 in which the vibration attenuation program 144 is applied to the torque signal, while the process 200 proceeds to step 225 and skips step 220 if the combined measured and control signal vibrations are less than or equal to the predetermined threshold value.

The conjoint consideration may be intended to estimate a level of steering wheel vibration that would occur without the intervention of the motor 160. As such, the decision rules in the vibration attenuation program 144 as to continuance, initiation, reduction, escalation or cessation of motor intervention may be achieved with appropriate assessment of the expected non-intervened vibration level. Further elaborating, if the state of the vibration attenuation is de-activated and vibrations are detected in the torque sensor 174, decision-making for initiation of attenuation may be achieved by comparing the vibration level with predetermined levels, either threshold tactile perceptible, or otherwise. In some cases, during periods of active attenuation, however, the level of vibration in the torque sensor alone may not permit estimation of a non-intervened level of vibration. For these cases, however, the measured vibrations in the torque sensor 174 and the amount of motor torque may be combined to estimate a non-intervened level of vibration and appropriate decision-making on the cessation, continuance, escalation or reduction of the intervention. Such decision-making can be achieved through formula calculations or tables of conjoint conditional operation at various levels of measured sensor torque and motor torque. These tables may indicate selected paired combinations of measured sensor torque and motor torque with any suitable type of many interpolative mechanisms practiced by those skilled in the art of controller programming. Furthermore, heuristics may be applied to mitigate or avoid jitter in repeatedly applying and not applying the vibration attenuation program 144. Any frequent repeated on-off cycling, which may be undesirable, may be avoided by implementation of hysteretic switching, with or without additional consideration for averaging times, sliding time windows or other mathematical operations over predetermined windows of time. For example, a heuristic threshold of 15% may be applied to the predetermined threshold value to mitigate or avoid short-term repeated application and non-application of the vibration attenuation program 144.

As noted above, if the controller 110 determines that the vibration attenuation program 144 is necessary or desired, the processor 122 executes the vibration attenuation program 144. The vibration attenuation program 144 includes a number of algorithms that generate attenuation signals based on the input signals. The vibration attenuation program 144 functions to remove, attenuate, or counteract the vibrations within the steering assembly 170. As noted above, the vibration attenuation program 144 functions to attenuate or eliminate smooth road shake. Examples of vibration attenuation programs may be found, for example, in application Ser. No. 12/326,684 and application Ser. No. 12/882,852, which are hereby incorporated by reference.

The vibration attenuation program 144 may be applied such that the amount of vibration attenuated as a result of the application may be varied. For example, the vibration attenuation program 144 may be applied in accordance with a first factor when the measured torque signals are relatively high and a second factor when the measured torque signals are relatively low. Moreover, in a further embodiment, such applied factors of the vibration attenuation program 144 produce measured torque signals that are relatively constant. In such an embodiment, the control of the vibration attenuation program 144 may be proportional to the measured torque signal. This provides consistent EPS response for the driver regardless of the environment. This embodiment also provides an ability of the controller 110 to variably apply the vibration attenuation program 144 such that the measured torque signals resulting from the vibrations are just below an acceptable threshold, which may provide other advantageous consequences such as further increasing energy efficiency of the EPS system 100, for example by limiting intervened suppression below levels of human vibratory perception.

In a fifth step 225, the processor 122 of the controller 110 executes the steering perception program 146 with the torque signals from step 215 or the attenuated torque signals from step 220. In some cases, the processing of the torque signals, particularly attenuated torque signals, may result in motor controls signals that cause a reduction in operating characteristics as perceived by the driver. Such cases may result in a reduction in road feel, which broadly refers to sensations such as loss of on-center steering, lash, low, or over-exposure to returned energy from the steering subsystem. The reduction in road feel results in an undesirable looseness at the steering wheel, particularly as a steering motion is reversed, such as when a driver turns in one direction and returns to a center position. Generally, on-center steering occurs when the vehicle is driven on a relatively long straight road and steering inputs from the driver are relatively minor, such as to keep the vehicle within the lane. These inputs are characterized as being small in amplitude (typically) ±10°, and slow in frequency (typically <1 Hz). Road feel is the torque feedback a driver gets through the steering wheel while driving the vehicle.

As such, the steering perception program 146 applies algorithms that provide a desired response at the steering wheel. The algorithms of the steering perception program 146 may include friction maps, such as LuGre friction maps, and damping maps. LuGre friction maps involve compensation relying on mechanical friction laws including static and dynamic friction, which in turn, may include velocity effects such as those characterized with Stribeck dependencies, or otherwise. In addition, velocity effects also electively incorporate velocity hysteresis dependency on accelerations. These hysteretic effects may be influenced by simplified dependencies on the polarity of the acceleration, or by more complex functional expressions, look-up tables or their equivalents. Generally, the effect of these programs 146 may achieve favorable driver perception in steering response derived from the torque feel through the steering wheel responsive to the steering motions while operating the vehicle. These perceptions derive from the correlative responses of torque and motions, which, in turn, arise from the combined effects of the mechanical actions supplemented with the controller-provided augmentations of torque from the motor 160. For favorable responses, the controller may provide motor torques responsive to steering wheel angular position, rates and accelerations. Examples include: (a) the creation of linear damping torques responsive to steering wheel angular velocities; (b) coulomb-like damping torques responsive to the sign of the steering wheel velocity; (c) LuGre-like damping torques responsive to the steering wheel velocity in a non-linear manner using acceleration for additional determination of velocity direction and selective of amplitude; and (d) elastic-responsive torque to supplement the restoring properties relating to the angular position, responsive to the angular position. As such, the relationships between driver developed torque at the steering wheel and the steering wheel motions may be manipulated to produce desirable results.

Figure 6:
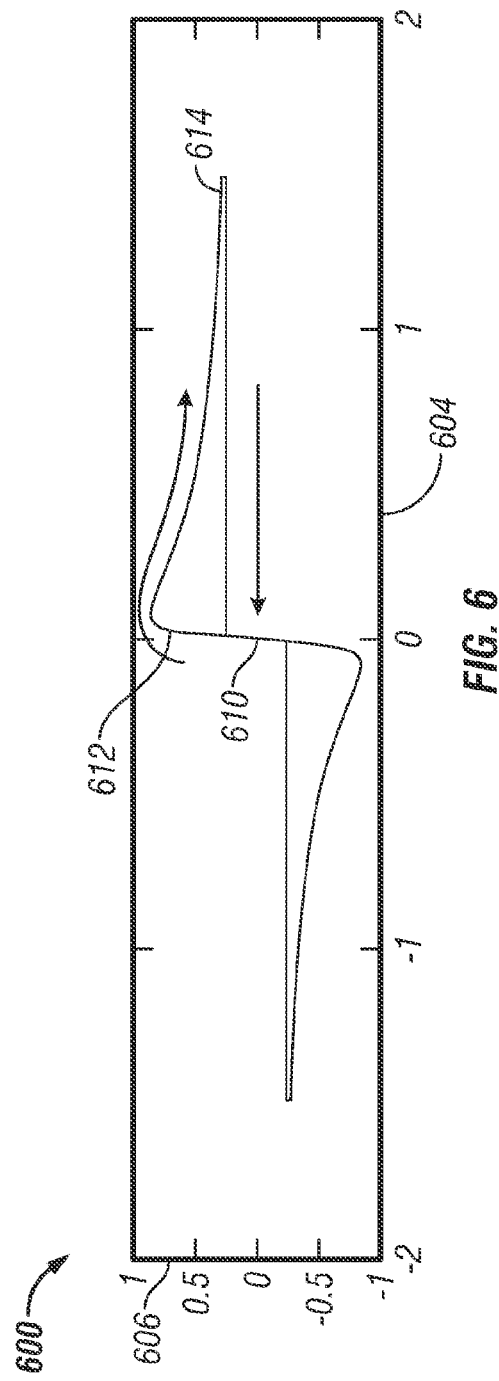
Figure 7:
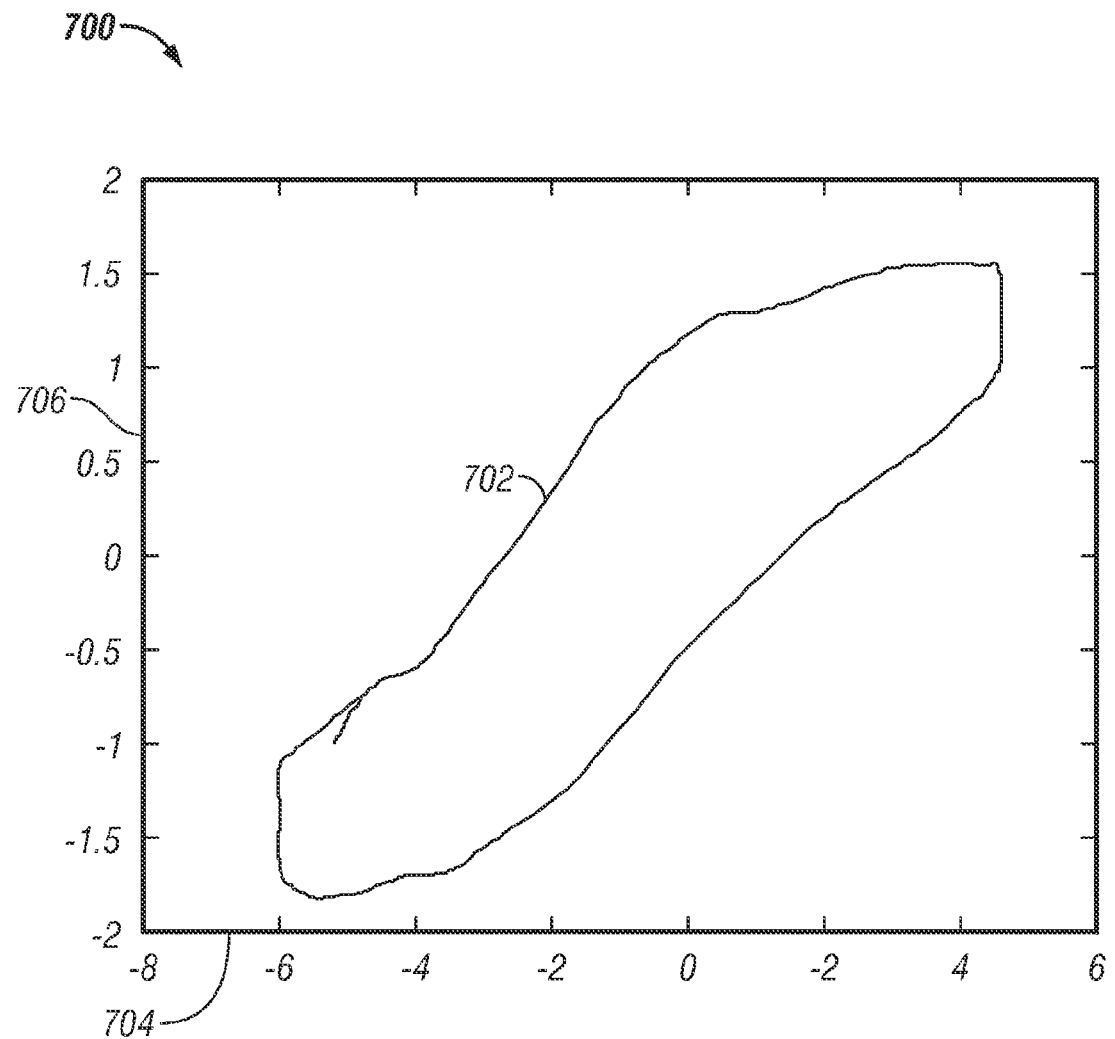
FIG. 7 is a graph illustrating an exemplary signature of an exemplary relationship between steering torque and steering angle used by the EPS system of FIG. 1 and the process of FIG. 2 in accordance with an exemplary embodiment.

An example of these capabilities is demonstrated by the exemplary signature 702 of steering torque vs steering angle relationships as depicted in the graph 700 of FIG. 7. In FIG. 7, steering wheel angle (in degrees) is represented on the horizontal axis 704 and steering wheel torque in (in Nm) is represented on the vertical axis 706. In FIG. 7, the signature 702 may represent, for example, the relationship observed without the intervention of the vibration attenuation and without significant periodic excitation. An exemplary use of the analysis of this signature 702 may decompose it to its various dynamic terms such as elastic, viscous damping, coulomb damping, LuGre damping, and inertia. Even if these terms are not readily apparent, such terms may be determined via various curve fitting and system identification techniques. The signature 702 could subsequently be used as a baseline for comparisons of similar relationships when vibration attenuation is active and attenuating significant vibrations. Progressive addition of motor control torque responsive to the steering wheel angular position and torques, and derivatives thereof, may be employed so that the final outcome approximates the originally observed signature 702. The steering perception programs 146 are discussed in greater detail below in reference to FIGS. 5 and 6.

In a sixth step 230, the processor 122 generates motor control signals based on the results of the steering perception program 146. The motor control signals may also be generated based on the torque at the steering wheel as the driver articulates the steering wheel to provide a torque assist as the driver navigates the vehicle.

In a seventh step 235, the processor 122 of the controller 110 determines whether to apply a dithering signal to the motor control signals. The decision may be based on, for example, driver selection, or may be automated based on available energy or energy priorities since fuel economy or battery life may be impacted by powering the dithering signal. As one example, when energy savings are an issue, the dithering signal may be omitted, while when performance is a higher priority, the dithering signal may be applied, as discussed below.

If the controller 110 determines that the dithering signal is to be applied, the controller 110 proceeds to step 240 in which the dithering program 142 is executed to apply a dithering signal to the motor control signal to thus produce a dithered (or "adjusted") motor control signal. The dithering signal may be a synthetic dither and generally refers to an applied form of noise to influence effects of stiction and friction. An exemplary dithering signal may have a frequency, for example, of 25 Hz and a level producing vibrations at the steering wheel below human thresholds of perceptible vibration through the hands as detected at the steering wheel.

In effect, the dithering program 142 may provide a mechanism for reducing or eliminating the impact of stiction or coulomb friction within the steering assembly 170 that would otherwise produce nonlinear torque signals, which may be more difficult to subsequently accommodate for desirable response. As discussed below, the dithering signal functions to approximately linearize, or reduce the nonlinearities, in the resulting torque with the superimposed dithered motor control signal. As discussed above in reference to step 225, the processor 122 executes the steering perception program 146 on the torque signals. Since the dithered motor control signals result in a less nonlinear torque as observed in the torque sensor due to external sources such as the driver or the steering subsystem, the measured torque signals resulting from the motor control signals are also less nonlinear. These torque signals may be more amenable to processing with the steering perception program 146 in step 225 and, if applicable, the vibration attenuation program 144 in step 215. In some embodiments, the steering perception program 146 and the vibration attenuation program 144 may process the torque signals differently based on whether or not dithering was applied to the motor control signals. For example, the vibration attenuation program 144 may have a first map selected for processing torque signals in the presence of dither and a second map selected for processing more nonlinear torque signals. Additional examples include multiple maps or blends of selected maps with either discrete or interpolated intervention depending on the various levels of observed dynamically sensed torque.

Figure 3:
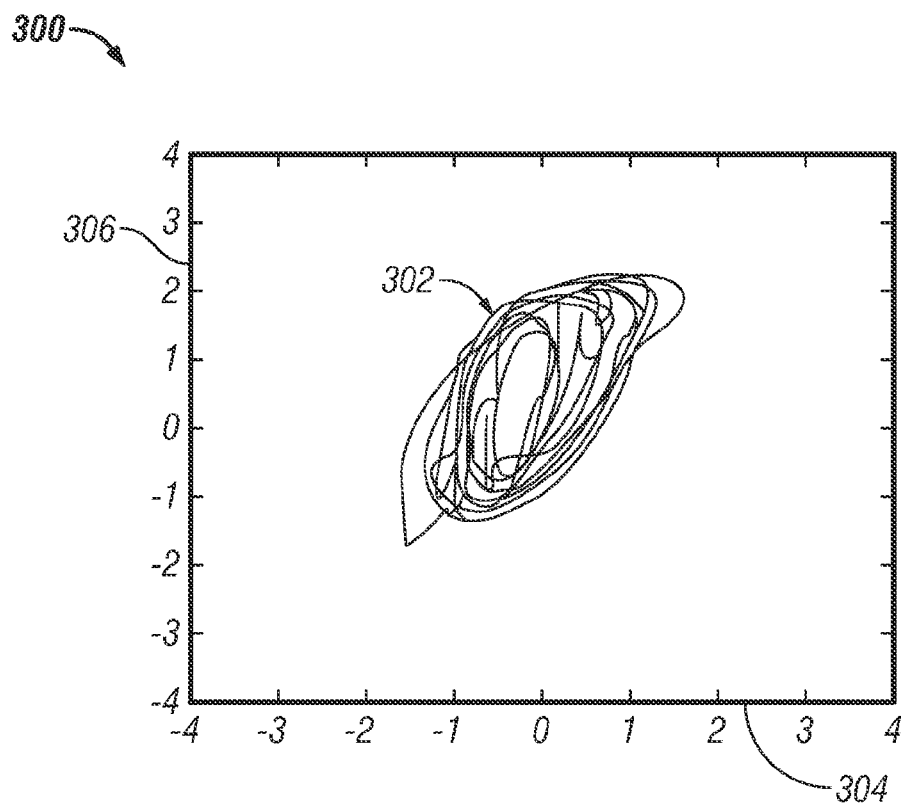
FIGS. 3 and 4 are graphs respectively illustrating measured torque responses resulting from nondithered motor control signals and dithered motor control signals in the EPS system of FIG. 1 and the process of FIG. 2 in accordance with an exemplary embodiment.
Figure 4:
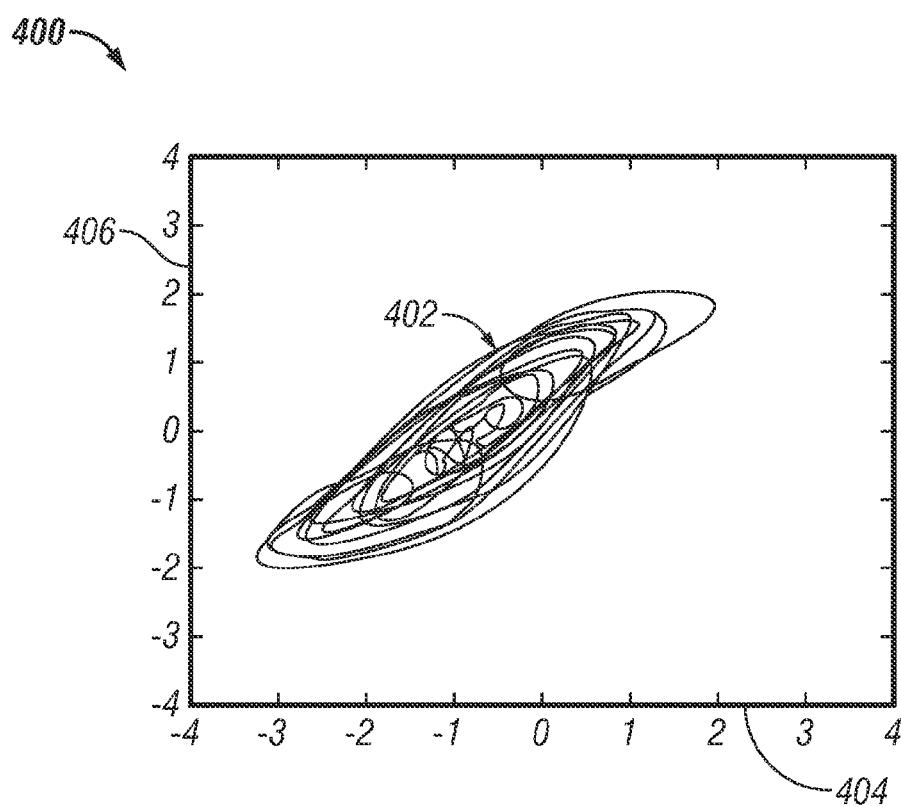

As an example, FIGS. 3 and 4 are graphs 300 and 400 respectively illustrating measured torque responses resulting from non-dithered motor control signals and dithered motor control signals in accordance with an exemplary embodiment. For example, the graph 300 illustrates a pattern 302 of measured torque (Nm), represented on the vertical axis 306, resulting from the steering wheel being pivoted through steering wheel angles (deg), represented on the horizontal axis 304, and non-dithered motor control signals. Similarly, the graph 400 illustrates a pattern 402 of measured torque (Nm), represented on the vertical axis 406, resulting from the steering wheel being pivoted through steering wheel angles (deg), represented on the horizontal axis 404, and dithered motor control signals. As shown by pattern 402, the dithered motor control signals produce a more linear response in the resulting torque signals.

Returning to FIGS. 1 and 2, the dithering signal may be applied at any suitable frequency and amplitude. In one exemplary embodiment, the amplitude and frequency of the dithering signal may be constant and/or continuous. In other exemplary embodiments, the characteristics of the dithering signal may depend upon the torque signal and motor drive. In effect, the dithering signal and the torque signal may be blended in any suitable manner. As such, the dithering signal may be applied continuously or strategically introduced during operation of the EPS system 100, including at times when no torque feedback signal is being produced within the steering assembly 170.

The dithering program 142 may be applied such that the amount of dither may be varied based on the measured or desired torque signals. For example, the dithering program 142 may be applied in accordance with a first factor when the measured torque signals are relatively high and a second factor when the measured torque signals are relatively low. Moreover, in a further embodiment, such applied factors of the dithering program 142 produce measured torque signals that are relatively constant. In such an embodiment, the control of the dithering program 142 would be proportional to the measured torque signal. This embodiment also provides an ability of the controller 110 to variably apply the dithering program 142 such that the measured torque signals resulting from the vibrations are just below an acceptable threshold, which may further increase energy efficiency of the EPS 100. In a further embodiment, the dithering signal may be controlled such that the mechanical response to the dithering signal, any vibration attenuation signals, and any excitation from an external source is approximately equal to that of the mechanical response to the dithering signal when the excitation and vibration attenuation signal are approximately zero.

In some exemplary embodiments, the dithering signal may be interactive with a mechanical resonance within the steering assembly 170. Such a mechanical resonance may correspond to a polar inertia of the motor 160 supported on the connecting linkage to the steering wheel shaft such that the dithering signal excites a natural mechanical resonance. This configuration may result in reduced electrical energy achieving comparable mechanical dithering in the steering subsystem to that produced while operating at other non-resonant frequencies. The dynamic amplification of this resonant system, or others, can thereby be used advantageously to produce desired dither at reduced levels of expended energy. Furthermore, a predetermined mechanical resonance may be built into the motor 160 and/or an inherent mechanical resonance may be measured and interact with the dithering signal. In such embodiments, the electrical energy required to produce the dithering signal is reduced in the presence of mechanically amplified dynamics.

Figure 5:
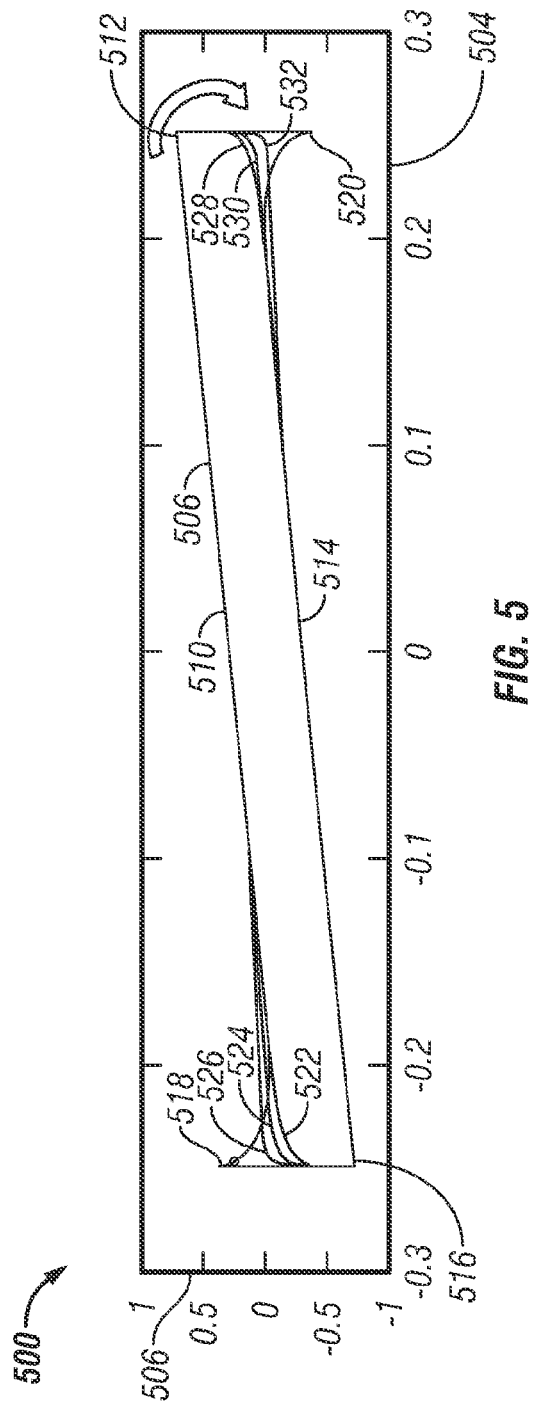
FIGS. 5 and 6 are graphs illustrating exemplary steering responses generated by the EPS system of FIG. 1 and the process of FIG. 2 in accordance with an exemplary embodiment.

In step 245, the processor 122 drives the motor 160 by supplying drive torque corresponding to the motor control signals from step 235 or the dithered motor control signals from step 240. As an example, FIGS. 5 and 6 are graphs 500 and 600 illustrating an exemplary response of the steering assembly 170 with the EPS system 100 of FIG. 1 and the process 200 of FIG. 2 in accordance with an exemplary embodiment. The graph 500 particularly plots the torque on the vertical axis 502 as a function of steer angle on the horizontal axis 504 along a steering path 506. For clarity in the explanation, points 510, 512, 514, and 516 are labeled on the steering path 506. Point 510 develops at the origin or at the centering of the steering wheel, i.e., while the steering wheel is at zero steering angle and with positive steering angle velocity. As the driver continues to steer the steering wheel, such as to the right, an increasing amount of torque counteracts the driver action, such as at point 512, and as the steering wheel velocity is reversed to return the steering wheel back to a center 514 of the steering wheel, the amount of torque decreases. Along this path from point 512, as the driver continues to rotate the steering wheel past the point at which the torque changes polarity to point 516, such as to the left, an increasing amount of torque counteracts the driver action unless the steering wheel velocity is again reversed at point 516 and again changes polarity. During the periods when the torque is diminishing as from point 512 and until the torque changes polarity (i.e., becomes negative in graph 500), energy is returned to the driver's hands. In one exemplary embodiment, these transitions may be influenced to create favorable torque signatures, particularly during these transitions, which may be accomplished through the techniques described above. The exaggerated transition zones proceeding from points 512 and 516 with the sharp pointed characteristics in regions 518, 520 may additionally indicate the need to manipulate the control torque in these zones. Alternative shapes, such as those with gradually progressive torque transitions 522, 524, 526, 528, 530, 532 are also possible and may produce favorable perceptions.

Furthermore, as an example, the graph 600 particularly plots the intervening component of the drive torque on the vertical axis 602 as a function of steer velocity on the horizontal axis 604 along a steering path 606 which is an exemplary control drive function of the steering perception program 146. For clarity in the explanation, points 610, 612, and 614 are labeled on the steering path 606. Point 610 refers to a null in velocity existing at the extremes of the steering wheel angle during a smooth steering maneuver as would occur near point 516 in FIG. 5. As the driver steers the steering wheel from this point 610, a relatively large amount of torque counteracts the driver action, such as at point 612, and as the velocity increases as the steering path continues to 614, the amount of torque is reduced. Subsequently, such as at point 614, the acceleration of the steering wheel is reversed as the driver returns the steering wheel to the center. The superimposed drive torque at the steering wheel is then maintained along the path 606 from point 614 to point 610. This path 606 is symmetric in the opposite quadrant, although other embodiments may include an asymmetric response path. Although the examples cited in the preceding show superimposed controlled drive torque as functions of steering wheel velocity and angle, it is also possible to introduce time-dependent superimposed drive torque at designated periods. Examples of these time-dependent interventions include applications of drive torque characterized as "one-shot" superpositions likened to "one-shot" applications of electronic monostable multivibrators. Additional examples involve adaptations of these crisp "one-shot" interventions as would be accomplished with a dynamic smoothing or restoration function.

As such, the responses exemplified and illustrated in FIGS. 5 and 6 produce favorable driver perceptions of steering. In general, any desirable response may be produced by application of the steering perception program 146 in step 250. The steering perception program 146 may be designed based on subjective evaluation of driver perceptions and customer satisfaction reports. The responses may be modified for any desired response, or implemented per benchmarking, and contrary to the graphs 500 and 600, are not necessarily symmetrical. Additionally, although the steering perception program 146 is illustrated as a separate function from that of the vibration attenuation program 144, the steering perception program 146 may be incorporated into the vibration attenuation program 144 in the form of modified algorithms or instructions.

In each of the steps above, the various signals may be processed with various transfer functions 132 and look-up tables 134 stored in the memory 130. For example, look-up tables 134 may correlate vehicle speed and gained torque with the desired motor drive command, which may be provided as a transfer function parameter for one or more transfer functions 132. The transfer functions 132 are selected to provide responses based on dynamic vehicle parameters or conditions, such as vehicle speed. The transfer functions 132 may provide a mechanism for introducing the motor control signals to compensate steering system dynamics. As such, the look-up tables 134, transfer functions 132, and control programs 140 are generally designed and/or selected to specify an optimal amount of motor torque drive that minimizes road shake while simultaneously achieving other performance demands, such as maintaining road feel. The steps in the process 200 are preferably continuously repeated in order to continually adjust the motor drive torque in order to minimize smooth road shake as the conditions and input variables change.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 120 may also otherwise differ from the embodiment depicted in FIG. 1, for example in that the computer system 120 may be connected to or may otherwise utilize one or more remote computer systems and/or other control systems.

Figure 2:
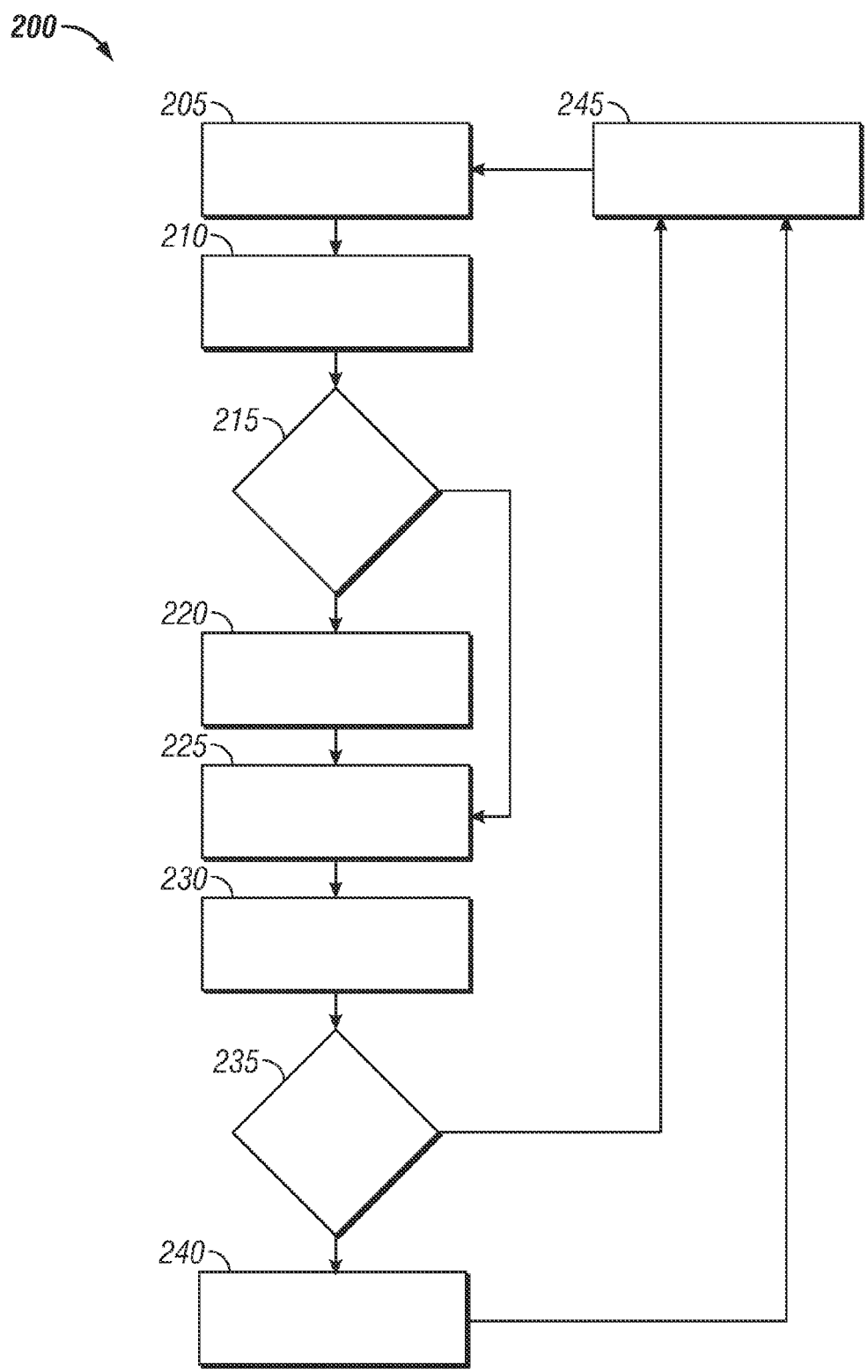
FIG. 2 is a flowchart of a process for controlling motor drive torque in an EPS system of the vehicle in accordance with an exemplary embodiment.

It will be appreciated that certain steps of the process 200 may vary from those depicted in FIG. 2 and described herein in certain embodiments. In addition, the application of control algorithms may use appropriate filtering techniques, such as digital, analog, or programmable software, or combinations thereof, provide equivalent performance. It will similarly be appreciated that certain steps of the process 200 may be performed simultaneously or in a different order than that depicted in FIG. 2 and described herein.

Accordingly, improved methods, program products, and systems are provided for optimally controlling motor drive torque in a vehicle. The improved methods, program products, and systems allow for smooth road shake to be better controlled based on dynamic inputs represented by the calculated vehicle speed along with the torque frequency and torque magnitude as determined from the torque signal received from the steering system of the vehicle. The improved methods, program products, and systems thus allow for motor drive torque to be increased at vehicle speeds and torque frequencies that are likely to result in smooth road shake to thereby minimize the smooth road shake under these conditions, while also allowing for the motor drive torque to remain unchanged at vehicle speeds and torque frequencies that are unlikely to result in smooth road shake.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, sport utilities, and cross-over vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling a motor drive torque in an electric power steering system having a motor and a steering assembly, the method comprising the steps of:
   measuring, with a torque sensor, internal vibrations within the steering assembly representing smooth road shake (SRS) to generate a torque signal;
   processing the torque signal in accordance with a steering perception program to produce a motor control signal suitable to control the motor;
   evaluating the smooth road shake (SRS) of the torque signal and generating a dithering signal based on the smooth road shake (SRS) of the torque signal;
   superimposing the dithering signal onto the motor control signal to linearize the motor control signal with the dithering signal and produce a dithered motor control signal; and
   controlling the motor drive torque of the motor on the steering assembly based on the dithered motor control signal.

2. The method of claim 1, wherein the superimposing step includes jointly considering the torque signal and the dithering signal.

3. The method of claim 1, wherein the processing step further includes processing the torque signal with a vibration attenuation program to produce a vibration attenuation signal as the motor control signal.

4. The method of claim 3, further comprising the steps of determining an excitation from an external source based on the torque signal, and wherein the superimposing step includes generating the dithered motor control signal such that a first mechanical response to the dithering signal, the vibration attenuation signal and the excitation is approximately equal to that of a second mechanical response to the dithering signal when the excitation and torque attenuation signal are approximately zero.

5. The method of claim 3, further comprising evaluating the torque signal and selectively executing the vibration compensation program based on the torque signal.

6. The method of claim 1, wherein the step of executing the steering perception program includes applying friction models to the torque signal.

7. The method of claim 6, wherein the step of applying friction models includes applying LuGre' friction maps.

8. The method of claim 1, further comprising the step of receiving a driver selection to activate the dithering signal, and wherein the superimposing the dithering signal is based on the driver selection.

9. The method of claim 1, further comprising the step of evaluating an amount of available energy in a battery, and wherein the superimposing the dithering signal is based on the available energy in the battery.

10. The method of claim 1, wherein the generating the dithering signal includes generating the dithering signal as an applied form of noise to influence effects of stiction and friction.

11. The method of claim 1, wherein the processing step includes processing the torque signal in accordance with the steering perception program that has a first map and a second map selected based upon the dithering signal.

12. A system for controlling a motor drive torque for a vehicle having a motor and a steering assembly, the system comprising:
   a sensor configured to measure internal vibrations within the steering assembly representing smooth road shake (SRS) to generate a torque signal; and a processor coupled to the sensor and configured to at least facilitate:
receiving the torque signal from the sensor;
processing the torque signal in accordance with a steering perception program to produce a motor control signal suitable to control the motor;
evaluating the smooth road shake (SRS) of the torque signal and generating a dithering signal based on the smooth road shake (SRS) of the torque signal;
superimposing the dithering signal onto the motor control signal to reduce the non-linearities of the steering system with the dithering signal and produce a dithered motor control signal; and
controlling the motor drive torque based on the dithered motor control signal.

13. The system of claim 12, wherein the processor is configured to apply vibration attenuation algorithms to the torque signal.

14. The system of claim 12, wherein the processor is configured to apply steering perception algorithms to the torque signal.

15. The system of claim 14, wherein the steering perception algorithms are friction models.

16. The system of claim 15, wherein the friction models are LuGre' friction maps.

17. A non-transitory program product for controlling a motor drive torque for a vehicle having a motor and a steering assembly, the non-transitory program product comprising:
a program configured to at least facilitate:
receiving a torque feedback signal from a torque sensor measuring internal vibrations within the steering assembly representing smooth road shake (SRS);
applying steering perception algorithms to the torque signal to generate a motor control signal suitable to control the motor;
evaluating the smooth road shake (SRS) of the torque signal and generating a dithering signal based on the smooth road shake (SRS) of the torque signal;
superimposing the dithering signal to the motor control signal onto produce a dithered motor control signal; and
controlling the motor drive torque based on the dithered motor control signal; and
a computer-readable signal bearing media bearing the program.

* * * * *